United States Patent

Smiley et al.

[11] Patent Number: 5,948,713
[45] Date of Patent: Sep. 7, 1999

[54] CRISTOBALITE-FREE MULLITE GRAIN AND METHOD OF PRODUCING SAME

[75] Inventors: William D. Smiley, Salinas, Calif.; Robert L. Antram, State College, Pa.; Randy Lemley, Pine Grove; Keith T. Snider, Sutter Creek, both of Calif.

[73] Assignee: North American Refractories Co., Cleveland, Ohio

[21] Appl. No.: 08/899,719

[22] Filed: Jul. 23, 1997

[51] Int. Cl.$^6$ ............................ C04B 33/00; C03C 10/04
[52] U.S. Cl. ............................ 501/5; 106/486; 264/639; 264/653; 264/176.1; 264/211; 264/211.11; 264/211.12; 501/4; 501/143; 501/144
[58] Field of Search ................................. 501/4, 5, 143, 501/144; 106/486; 264/639, 653, 176.1, 211, 211.11, 211.12

[56] References Cited

U.S. PATENT DOCUMENTS

| | | | |
|---|---|---|---|
| 3,431,128 | 3/1969 | Fukui | 501/143 |
| 4,272,500 | 6/1981 | Eggerding et al. | 501/5 |
| 4,396,720 | 8/1983 | Beall et al. | 501/5 |
| 4,717,695 | 1/1988 | Oda | 501/143 |
| 4,843,047 | 6/1989 | Oda | 501/129 |
| 5,281,462 | 1/1994 | Day et al. | 501/5 |
| 5,461,015 | 10/1995 | Kinsman et al. | 501/144 |
| 5,565,392 | 10/1996 | Kinsman et al. | 501/143 |

FOREIGN PATENT DOCUMENTS

| | | | |
|---|---|---|---|
| 281420 | 9/1988 | European Pat. Off. | 501/143 |
| 148630 | 6/1981 | Germany | 501/144 |
| 213202 | 9/1984 | Germany | 501/144 |
| 61-09869 | 8/1981 | Japan | 501/144 |
| 59-131562 | 7/1984 | Japan | 501/144 |
| 59-199568 | 10/1984 | Japan | 501/143 |
| 60-033247 | 2/1985 | Japan | 501/143 |
| 704927 | 12/1979 | U.S.S.R. | 501/144 |

OTHER PUBLICATIONS

Chemical Abstract No. 77:155760, abstract of an article by Hamano et al entitled: "Factors affecting the mechanical properties of porcelain bodies", Mech. Behav. Mater., Proc. Int. Conf. 1st, vol. 4, 475–83, no month 1972.

Chemical Abstract No. 89:79093, abstract of an article by Schroeder entitled: "Inexpensive high strength electrical porcelain", Am. Ceram. Soc., Bull. 57(5), 526, no month 1978.

*Primary Examiner*—Anthony Green
*Attorney, Agent, or Firm*—Mark Kusner

[57] ABSTRACT

A method of calcining kaolin, comprising the steps of:

a) producing a clay slurry comprised of water and kaolin clay of a specific particle size;

b) mixing a water insoluble potassium containing glass forming compound into the clay slurry in an amount wherein the potassium content of the slurry is equal to about 1% by weight of the kaolin clay in the slurry;

c) removing sufficient water from the slurry to form a material having an extrudable consistency;

d) extruding the material into elongated shapes;

e) heating the shapes by continuously moving them through a furnace having a zone, wherein the material is exposed to temperatures of at least 2700° C. for at least 30 minutes.

11 Claims, 8 Drawing Sheets

CRISTOBALITE-FREE MULLITE GRAIN AND METHOD OF PRODUCING SAME

FIELD OF THE INVENTION

The present invention relates generally to a process for calcining kaolin clay, and more particularly to a process for producing cristobalite-free, mullite grain, attended by the in situ synthesis of an amorphous, highly siliceous bonding phase for the mullite grains.

BACKGROUND OF THE INVENTION

Mullite ($3Al_2O_3 * 2SiO_2$) is a material (typically provided in granular form) that is widely used in the manufacture of refractory products and components. In this respect, mullite is the only alumina-silica compound that remains stable at very high temperatures, neither melting nor showing any noticeable reaction until a temperature of about 3270° F. (1800° C.) is reached. As a result, mullite grain/grog is typically used as the basic component in refractory products for high temperature applications.

Basically, every alumina-silica complex will form some mullite when fired to temperatures exceeding 2192° F. (1200° C.), but the actual amount formed not only depends on the firing temperature and the ratio of alumina to silica, but is also influenced enormously by the form in which both components are introduced, and by the kind and quantity of impurities present. For example, one refractory body containing 69% alumina ($Al_2O_3$) and 27% silica ($SiO_2$) may produce 89% mullite when fired, while another containing 71% alumina and 23% silica produces less than 35% mullite when fired.

It is known to form mullite by calcining kaolin clay. When pure kaolin clay is fired, it typically produces about 55% mullite. The mullite is in the form of crystals that are bonded by two forms of silica, i.e., cristobalite (which is one of the polymorphic crystalline forms of silica) and amorphous silica. The cristobalite forms about 15% of the resulting material of the fired or calcined kaolin, and the amorphous silica forms about 30% of the resulting material.

It is generally known that during rapid heating or cooling in the temperature range of 200° C. to 250° C. cristobalite undergoes a high/low inversion that is attended by a large change in volume. This crystallographic change of cristobalite makes mullite grain having cristobalite therein highly undesirable for high-temperature refractory materials and products, in that such a volume change may result in cracking of the refractory product. It is therefore highly desirable to produce a mullite grain/grog by calcining kaolin such that the final mullite grain/grog is free of cristobalite.

It is generally known that certain naturally occurring English kaolin clay, when calcined to high temperatures (i.e., in the neighborhood of approximately 2790° F.) for long periods of time (approximately 60 hours) yields a substantially cristobalite-free mullite grain, having about 1% cristobalite. The absence of cristobalite in calcined English kaolin clay, that is fired as described above, is attributed to the presence of impurities in the clay, which impurities react with silica at elevated temperatures. Specifically, it is believed that naturally-occurring impurities found in natural English kaolin clay that have an affinity for silica react with the cristolbalite present to dissolve same during the prolonged soak period. The prohibitive energy costs of firing such clay for such a prolonged period of time make use of English kaolin clay and the aforementioned process less than desirable in producing cristobalite-free mullite.

It is also known to produce cristobalite-free mullite from clay by adding a suitable amount of alumina thereto and heating the clay to very high temperatures (in the range of about 3200° F.). In this process, the additional alumina reacts with available silica to form additional mullite. However, this process is also cost-intensive due to the alumina additive and the energy required for firing at such high temperatures.

The present invention overcomes these and other problems and provides a method of producing cristobalite-free mullite grain, in substantially less time with substantially less energy than known heretofore, and at the same time, produces a mullite grain that is bonded by an extremely viscous, highly siliceous amorphous matrix.

SUMMARY OF THE INVENTION

In accordance with the present invention, there is provided a method of calcining kaolin comprising the steps of:
a) producing a clay slurry comprised of water and kaolin clay of a specific particle size;
b) thoroughly mixing a glass forming comi-position with said clay slurry, the glass forming composition including water insoluble potassium and having a particle size about equal to the particle size of the kaolin clay within said clay slurry, said composition being added in an amount wherein the potassium content of said clay slurry is equal to about 1% by weight of the kaolin clay in the clay slurry;
c) removing sufficient water from the slurry to give the slurry an extrudable consistency;
d) extniding the slurry into elongated shapes; and
e) heating said elongated shapes by continuously moving the elongated shapes through a furnace having a zone, wherein the shapes are exposed to a temperature of at least 2700° F., wherein the extruded material is exposed to a 2700° F. zone for at least 30 minutes.

In accordance with another aspect of the present invention, there is provided a method of producing cristobalite-free, calcined kaolin, comprising the steps of:
a) preparing a kaolin clay slurry comprised of water and kaolin clay of a predetermined particle size;
b) thoroughly mixing a fluxing agent comprising a potassium containing glass forming compound with said kaolin clay slurry, said compound being selected from the group consisting of potash feldspar, colemanite and E-glass;
c) heating the kaolin clay at a sufficient temperature for a sufficient period of time to:
  i) dehydrate said clay,
  ii) delhydroxylate said dehydrated clay to form metakaolin,
  iii) break down said metakaolin to form mullite and concomitantly forming a liquid phase material comprised of silica, alumina and potassium oxide; and
d) cooling said mullite and said liquid phase material.

In accordance with another aspect of the present invention, there is provided a refractory material comprised of mullite crystals in a cristobalite-free matrix of an obsidian-like material. The mullite crystals are identifiable by X-ray diffraction peaks at $2\theta=16.5°, 31°, 33.3°, 35.3°$ and 40.90, and the obsidian-like material is identifiable by an X-ray amorphous hump at $2\theta=17°$ to $29°$, and said obsidian-like material is comprised of the following by weight:
about 81% $SiO_2$
about 12.8% $Al_2O_3$
about 3.4% $K_2O$.

It is an object of the present invention to provide a process for calcining kaolin.

Another object of the present invention is to provide a process to produce cristobalite-free mullite from kaolin clay.

Another object of the present invention is to provide cristobalite-free mullite in a less time-consuming and a more cost-effective manner than processes known heretofore.

A still further object of the present invention is to provide cristobalite-free mullite as described above, wherein the mullite grains are bonded by a highly siliceous, amorphous solid, having an exceedingly high viscosity at high temperatures.

A still further object of the present invention is to provide a process to produce calcined kaolin as described above, wherein mullite grain is bonded by a super-cooled liquid (glass) having obsidian-like properties.

A still further object of the present invention is to provide a process as described above to produce calcined kaolin that does not undergo a large volume change in the 200° C. to 250° C. temperature range with a rapid change in temperature.

These and other objects and advantages will become apparent from the following description of a preferred embodiment of the present invention taken together with the accompanying drawings.

BRIEF DESCRIPTION OF THE DRAWINGS

A preferred embodiment of the invention will be described in detail in the specification and illustrated in the accompanying drawings which form a part hereof, and wherein.

DETAILED DESCRIPTION OF PREFERRED EMBODIMENT

The present invention relates to a process for forming cristobalite-free, mullite grain with concomitant formation of an amorphous, highly siliceous bonding phase for the mullite. Basically, kaolin clay and a fluxing additive are combined such that, upon firing, the formation of cristobalite is retarded and that which is formed is dissolved into and reacts with the fluxing additive to form mullite. Concomitantly, the amorphous silica formed during the firing of the kaolin clay reacts with the fluxing agent to form an amorphous, highly siliceous bonding phase for the mullite, having an exceedingly high viscosity at elevated temperatures.

In accordance with the present invention, the fluxing additive is a potassium containing glass forming compound. The potassium within the glass forming compound is preferably water insoluble. While potassium will be described with respect to a preferred embodiment, glass forming compounds containing other alkali metals may be used. The compound has a particle size dimensioned in relation to the particle size of the kaolin clay to facilitate uniform mixing and distribution, and is added to the kaolin clay in a proportion to optimize reaction with the silica present in the kaolin clay, as will be described in greater detail below. The compound is thoroughly mixed with the kaolin clay to uniformly distribute the fluxing material therein.

The preparation of the cristobalite-free mullite grain involves two generally distinct stages. The first stage is generally a processing stage, wherein the kaolin clay and the fluxing additive are prepared for heating. The processing stage basically is comprised of the following steps: (1) a beneficiation step to remove undesirable impurities from kaolin clay and to establish a desirable particle size; (2) a step of blending the kaolin clay with a fluxing additive; (3) a step of processing of the kaolin clay into an extrudable form; and (4) a step of extruding the kaolin clay into a preferred size for heating.

Once extruded into a desired shape and form, the kaolin clay undergoes a heating stage which is basically comprised of: (1) a dehydration phase; (2) a dehydroxylization phase and metakaolin formation phase; (3) a reaction phase with a fluxing additive; and (4) a recrystallization phase of the metakaolin to mullite. The foregoing stages, steps and phases shall now be described in greater detail with respect to a preferred process. It will, of course, be understood that changes and modifications will occur to those skilled in the art upon a reading and understanding of the specification.

It is important to the present invention that the kaolin clay that is to be ultimately heated and converted to mullite be substantially free of impurities and undesirable materials. Accordingly, a beneficiation step to separate the kaolin clay from sand and other undesirable particles is conducted. In this respect, the kaolin clay is preferably separated from sand and other impurities by a washing process, wherein the kaolin clay and water form a watery slurry which is passed through hydroclones to obtain a slurry containing kaolin clay having a specific particle size distribution. In this respect, kaolin clay having a particle size of about 20 microns is sufficiently small so as to be separable from sand. However, the 20-micron particle size in and of itself is not critical to the present invention. It is only important that the resultant kaolin clay slurry be substantially free from impurities and sand. It has been found that kaolin clay having a particle size of less than 20 microns may be separated from sand which is typically larger in size.

The clay slurry obtained from the aforementioned beneficiation step would typically be comprised substantially of water. This watery slurry is preferably "thickened" to a point where the kaolin clay forms about 30% by weight of the slurry. In other words, the slurry is comprised of 30% by weight of solids in the form of kaolin clay particles. As used herein, the term "thickening" refers to basically the removal of water from the slurry. This may be accomplished by conventional settling tanks, wherein the solid particles are settled and the water separated therefrom. At this point, a fluxing additive is added to the slurry and mixed therewith. In accordance with the preferred embodiment of the present invention, orthoclase feldspar ($K_2O*Al_2O_3*6SiO_2$) is added and mixed with the slurry. The orthoclase feldspar has the following chemical composition, by weight:

about 66% $SiO_2$
about 18% $Al_2O_3$
about 13% $K_2O$
less than 1% CaO
less than 0.2% $Fe_2O_3$.

The feldspar preferably has a $K_2O$ to $Na_2O$ ratio of about 7 to 1. The feldspar is added in an amount equal to approximately 10% by weight of the clay solids.

The feldspar preferably has a particle size dimensioned to match the particle size of the kaolin particles in the slurry so as to facilitate thorough mixing and interaction of the feldspar with the kaolin clay particles.

In the present embodiment, the physical specifications of the feldspar are as follows:

+200 mesh—0.5% max

+325 mesh—4.5% max $D_{50}$ about 12 microns.

The feldspar is added to the clay slurry based upon the weight of kaolin clay solid in the slurry. In accordance with the present invention, the feldspar is added in an amount such that the potassium oxide ($K_2O$) from the feldspar comprises about 1% by weight of the solid in the kaolin clay slurry. Stated another way, the addition of the feldspar should give the solids within the slurry, i.e., the kaolin clay, a potassium oxide composition of about 1%. In this respect, it has been found that at concentrations of potassium oxide below about 1% by weight, cristobalite forms, and at concentrations of potassium oxide above about 1% by weight, a more fluid glassy bonding phase is produced. The 1% concentration of potassium oxide to kaolin clay is established by adding the feldspar in an amount equal to about 10% (by weight) of the kaolin clay solid in the slurry.

The resultant slurry containing the kaolin clay and the feldspar is then thickened from 30% by weight solids to an extrudable 78% by weight solids by means of vacuum filters and drying ovens. A small amount of a binder (such as aluminum sulfate) is preferably added to the kaolin to provide "green strength" to the kaolin so as to prevent the kaolin from completely breaking down into a powder during the heating step that shall hereinafter be described. The kaolin material is then preferably passed through a pug mill to form an extrudate having a spaghetti-like shape (approximately ⅜ inch in diameter).

The processing as heretofore described refers to specific steps for the preparation of the kaolin clay. The specific steps in and of themselves are not critical so long as the resultant kaolin clay is mixed with the fluxing potash feldspar in proper proportion and particle size to facilitate the dissolution and reaction as shall hereinafter he described.

Referring now to the heating stages of the process, i.e., the transformation from kaolin clay to mullite. In accordance with the present invention, the kaolin clay undergoes several physical changes during firing, namely: (1) a dehydration phase; (2) a dehydroxylization phase; (3) a metakaolination phase; (4) a dissolution and reaction between the feldspar and metakaolin; and, (5) a recrystallization of the metakaolin into mullite. Each of these changes takes place at different heat levels. According to a preferred process, the kaolin clay as an extrudate is introduced into a conventional rotary kiln capable of attaining a temperature of at least 2750° F. The data and information set forth within the present specification are based upon forming mullite grain from kaolin in such a conventional rotary kiln.

Within the kiln, a temperature gradient is developed from the entry end of the kiln to the exit end of the kiln. Specifically, at or near the kiln entrance, a temperature of approximately 800° F. is established. From this temperature, the kiln increases in temperature to approximately 2750° F. near the exit end of the kiln. The temperature gradient established within the kiln is basically a natural result of the phase changes and chemical reactions of the kaolin as it proceeds through the kiln. Stated another way, the temperature gradient established within the kiln is produced as a natural consequence of the endothermic or exothermic interplay of heat with the kaolin clay.

Specifically, at the entrance of the kiln, the dehydration phase of the heating process occurs as the hydrated kaolin clay absorbs heat to drive off moisture. This dehydration of the clay maintains the temperature near the entry end of the kiln at approximately 800° F. to 900° F. With respect to the dehydroxylization phase, hydroxyl ions and hydrogen ions are driven off such that only a small percentage of only the strongest bonded hydroxyls remain within the kaolin structure. This process likewise requires energy. It should be pointed out that the extruded kaolin, because it is dehydrated, breaks down into pellets during the calcination process. During the dehydroxylization phase, the crystalline kaolin is converted to amorphous metakaolin. This conversion occurs at temperatures between 1000° F. to 1400° F. At slightly higher temperatures, the now decomposed metakaolin typically recrystallizes to form mullite. This recrystallization occurs at a temperature of about 1800° F. Normally, in the absence of potassium oxide, cristobalite and amorphous silica are also formed at about 1800° F. However, in the presence of the potash feldspar, it is believed that in addition to the recrystallization of the decomposed metakaolin into mullite, separate solid state reactions occur. It is believed that during the recrystallization of metakaolin into mullite, which is a highly reactive event, free silica released during the recrystallization forms a liquid phase with the potash feldspar. At the same time, some cristobalite and amorphous silica may form as a result of recrystallization. Nevertheless, it is believed that separate solid state reactions occur between the formed cristobalite and the potash feldspar and the formed amorphous silica and the potash feldspar, with all these solid state reactions contributing to the liquid phase.

As the temperature of the material increases, residual feldspar melts at about 2100° F., more mullite is formed and more amorphous silica is formed as a by-product of the recrystallization of the metakaolin. As it is formed, the amorphous silica is dissolved into the liquid phase. A further rise in temperature to a soak temperature of about 2700° F. completes mullitization and mullite crystal growth. At this temperature, complete wetting of the mullite by the amorphous phase occurs. Importantly, the cristobalite silica is drawn into the liquid phase at quite a low temperature (approximately 1800° F.). Generally, potash feldspar, by itself, would melt at 2050° F. with decomposition occurring at that temperature. However, when in contact with silica, the potash feldspar, through a solid state reaction, forms a liquid eutectic at approximately 1800° F. Thus, the dissolving of the cristobalite into the liquid phase occurs at a lower temperature than would occur naturally. This lower melting and reaction temperature is believed to be the result of the purity of the material and the thorough mixing and matching of the potash and kaolin particle sizes. In other words, the potash feldspar is in contact with silica to facilitate the formation of the eutectic liquid at 1800° F. The material is preferably allowed to soak at a higher temperature of about 2700° F. to complete the mullitization and mullite crystal growth, during which complete wetting of the mullite by the liquid material is accomplished. Upon cooling, the liquid material forms an amorphous, highly silicous bonding phase for the mullite grains that is similar to obsidian.

The dehydroxylization of the crystalline kaolin to form amorphous metakaolin is set forth as follows:

(1)

This reaction occurs at temperatures between 1000° F. and 1400° F. Increased heating of the material causes recrystallization of the amorphous metakaolin to form mullite and cristobalite. Amorphous silica is also formed as a by-product of the recrystallization of the amorphous metakaolin. This reaction is set forth as follows:

(2)

Simultaneous to the recrystallization of the amorphous metakaolin into mullite and cristobalite, and the formation of amorphous silica, solid state reactions between the potash feldspar and the cristobalite and the potash feldspar and the amorphous silica occur. These reactions are set forth as follows:

(3)

This reaction occurs at temperatures between 1800OF and 2000° F. In this respect, as indicated above, the potash feldspar has a melting temperature of 2050° F., but because of the presence of silica, cristobalite and amorphous silica, a eutectic liquid is formed at 1800° F. through a solid state reaction with the silica. Further soaking of the material at temperatures of about 2600° F. to 2700° F. completes the conversion of the cristobalite to mullite and also completes the solid state reaction of the amorphous silica and potash feldspar producing a liquid phase that wets the mullite crystals at the soak temperature of 2750OF. The composition of the liquid phase is characterized as obsidian-like, as evidenced by its X-ray signature. During the high temperature soak at 2750O° F., the mullite crystals increase in size and the wetting of the mullite by the liquid phase is completed.

The composition of liquid phase is calculated, from the quantities and composition of kaolin and the feldspar used, to be approximately as follows: 3.4% $K_2O$, 12.8% $Al_2O_3$, 81% $SiO_2$ and 2.8% $TiO_2$, together with small amounts (less than 1%) of $Na_2O$, $Fe_2O_3$ and CaO. Generally, it has been found that the conversion of the kaolin clay to mullite and the liquid phase can occur within approximately 2½ to 3 hours. Specifically, for extrudates having approximately ⅜" diameter, a kiln having an entrance temperature of about 800° F. to 900° F. and a firing zone temperature near the exit end of the kiln of about 2750° F. and a rotary speed of 40 rph at approximately 2 to 3 hours was required to complete the mullitization and mullite crystal growth of the clay. Once discharged from the kiln, the pellets are preferably cooled to a handling temperature in about 45 minutes. Thereafter, crushing and separating of the cooled pellets to a desired size range may be undertaken.

By heating kaolin clay and potash feldspar under the foregoing conditions, a cristobalite-free mullite grain is produced. The absence of cristobalite is established by conventional X-ray defraction techniques. FIG. 1 discloses an X-ray pattern for material formed in accordance with the foregoing process. Noticeably, peaks that would normally be found at 2θ=22°, 31.5° and 36° are absent. Characteristic mullite peaks predominate the pattern at 2θ=16.5°, 26.5°, 31°, 33.3°, 35.3° and 40.90°.

Figure 3:
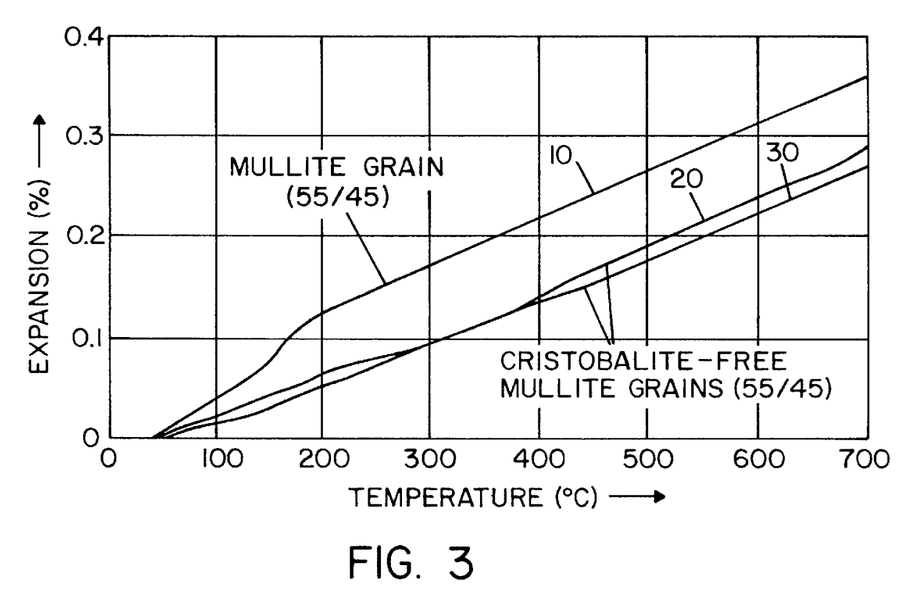
FIG. 3 is a graph showing thermal expansion versus temperature curves for calcined kaolin with and without cristobalite.

The absence of cristobalite is further established by a thermal expansion graph. FIG. 3 shows "linear change vs. temperature" curves for mullite with cristobalite and cristobalite-free mullite formed in accordance with the present invention. Curve 10 shows heating of mullite with cristobalite. A noticeable change in the slope of line 10 can be seen at about 200° C., indicating the high/low inversion that cristobalite undergoes at about this temperature. Lines 20 and 30 show heating mullite material formed in accordance with the present invention. No noticeable changes in the slope of lines 20 and 30 is seen at about 200° C., indicating an absence of cristobalite.

In the context of the present invention, it is believed that the reactive amorphous silica, which is generated as the kaolin clay is transformed to amorphous metakaolin in the first stages of the kiln, reacts with the finely divided potash feldspar additive in a solid state reaction at about 1800° F. to form a eutectic liquid. As the mixture moves progressively to higher temperature zones of the kiln, mullite crystals form and are wetted by the liquid phase. More amorphous silica is taken into the liquid phase during the soak at an elevated temperature of 2750° F. At this point, the composition of the liquid may be characterized as "obsidian-like."

The similarity of the matrix formed by the present invention to obsidian and Darwin Tektite is seen in the following table, which compares the composition of the glassy phase matrix of the present invention with that of obsidian and Darwin Tektite.

| | COMPOSITION % WEIGHT | | |
|---|---|---|---|
| | Glassy Phase of Present Invention | Typical Obsidian | Darwin Tektite |
| $SiO_2$ | 81.0 | 77.0 | 87.0 |
| $Al_2O_3$ | 12.8 | 12.7 | 8.0 |
| $K_2O$ | 3.4 | 4.4 | 0.99 |
| $Na_2O$ | 0.5 | 3.5 | 0.14 |
| $TiO_2$ | 2.8 | 0.1 | 0.51 |
| $Fe_2O_3$ | 0.25 | 1.1 | 2.12 |
| MgO | — | 0.17 | 0.82 |
| CaO | 0.1 | 0.6 | — |
| $H_2O$ | — | 0.49 | 0.36 |

Figure 1A:
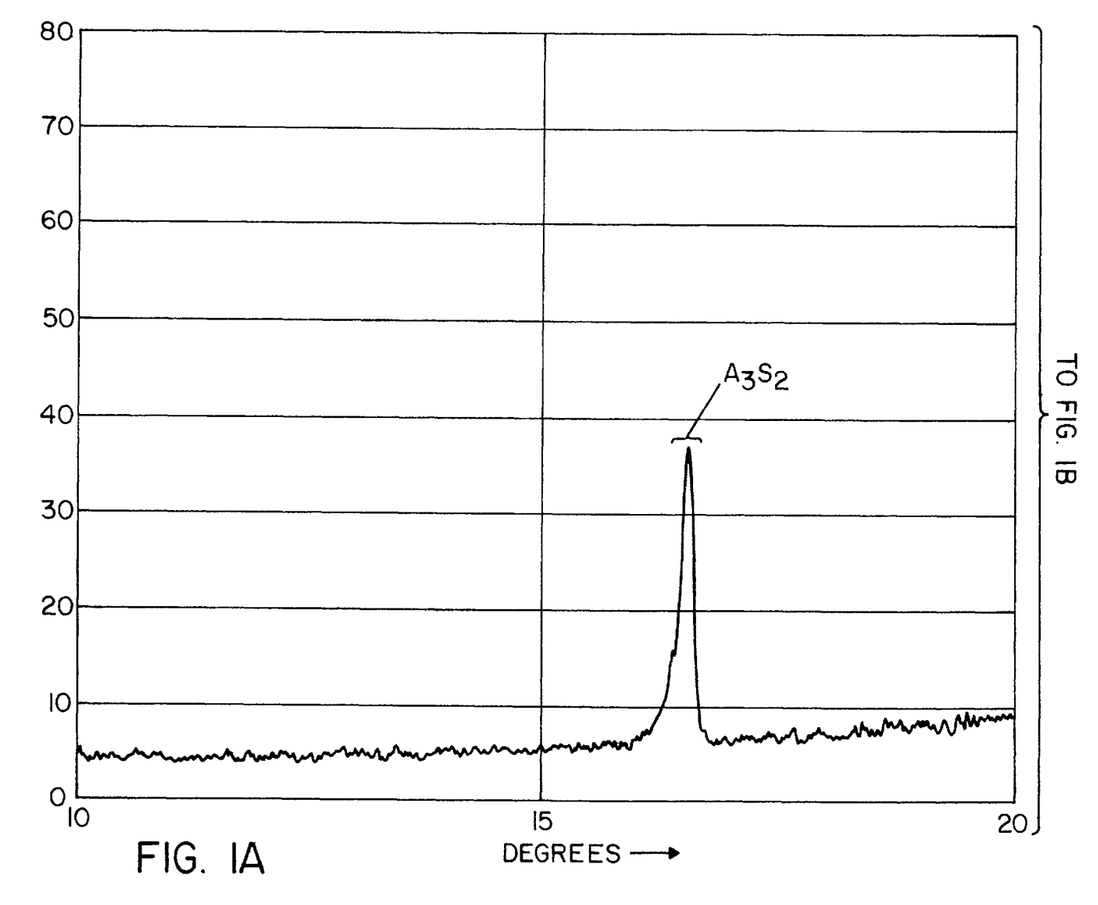
FIGS. 1A–1F are a X-ray defraction graphs of a material formed in accordance with the present invention illustrating a mullite material free of cristobalite (containing an amorphous phase)
Figure 1B:
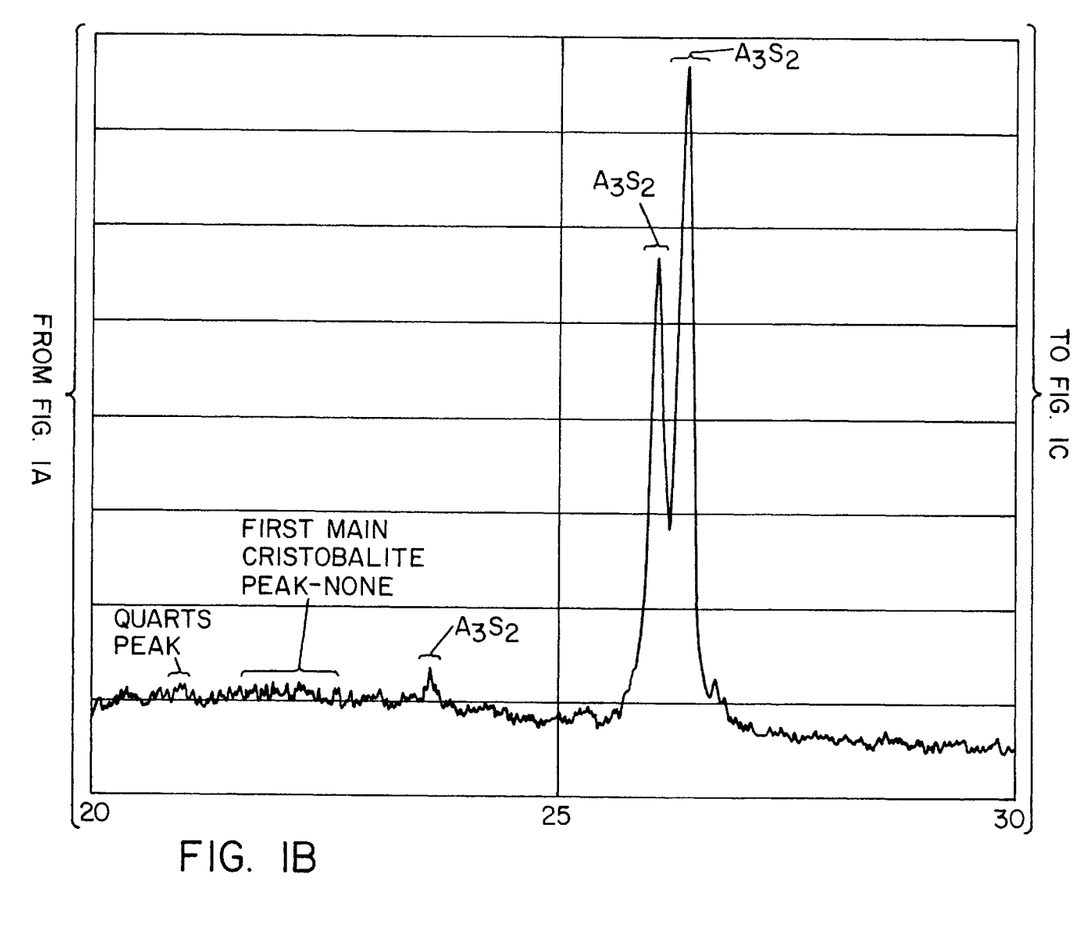
Figure 1C:
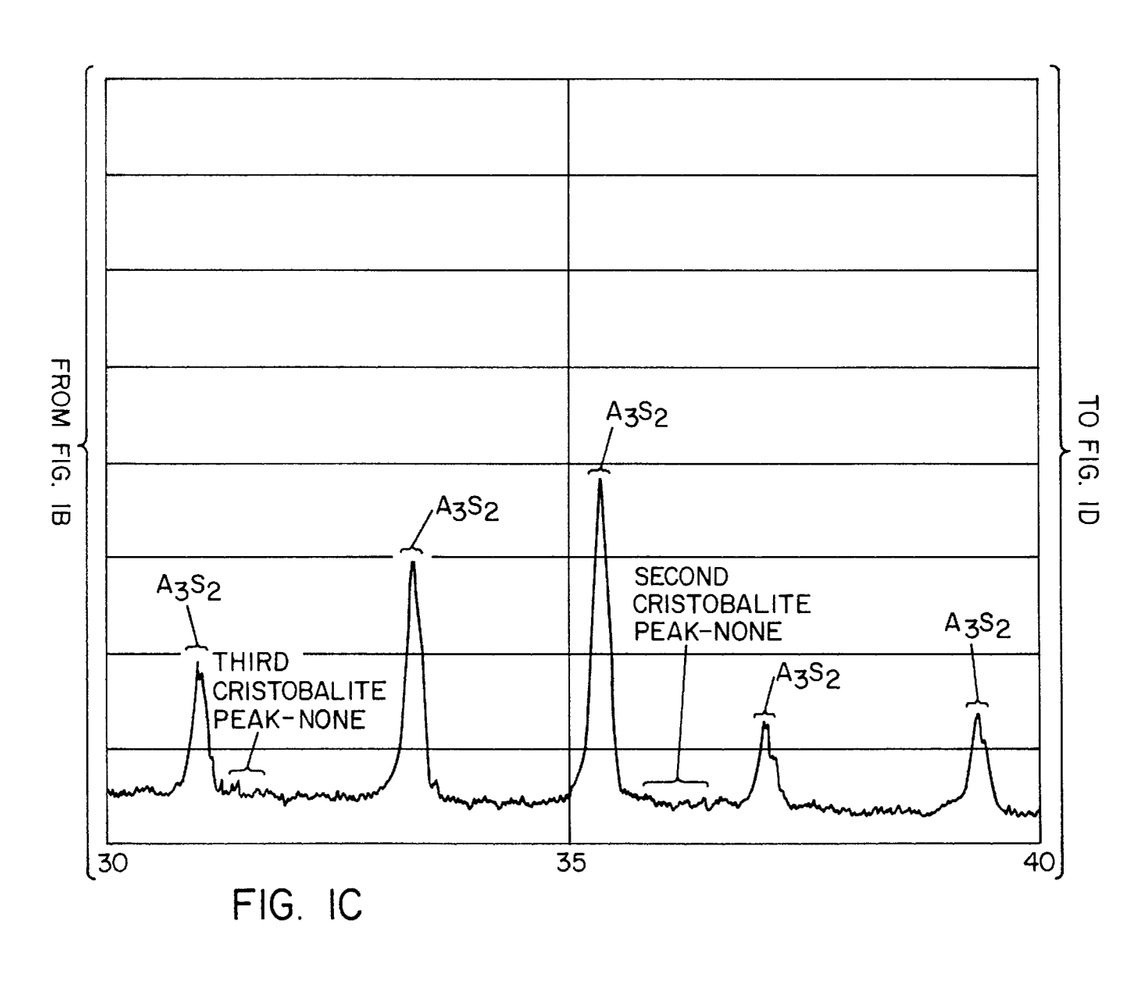
Figure 1D:
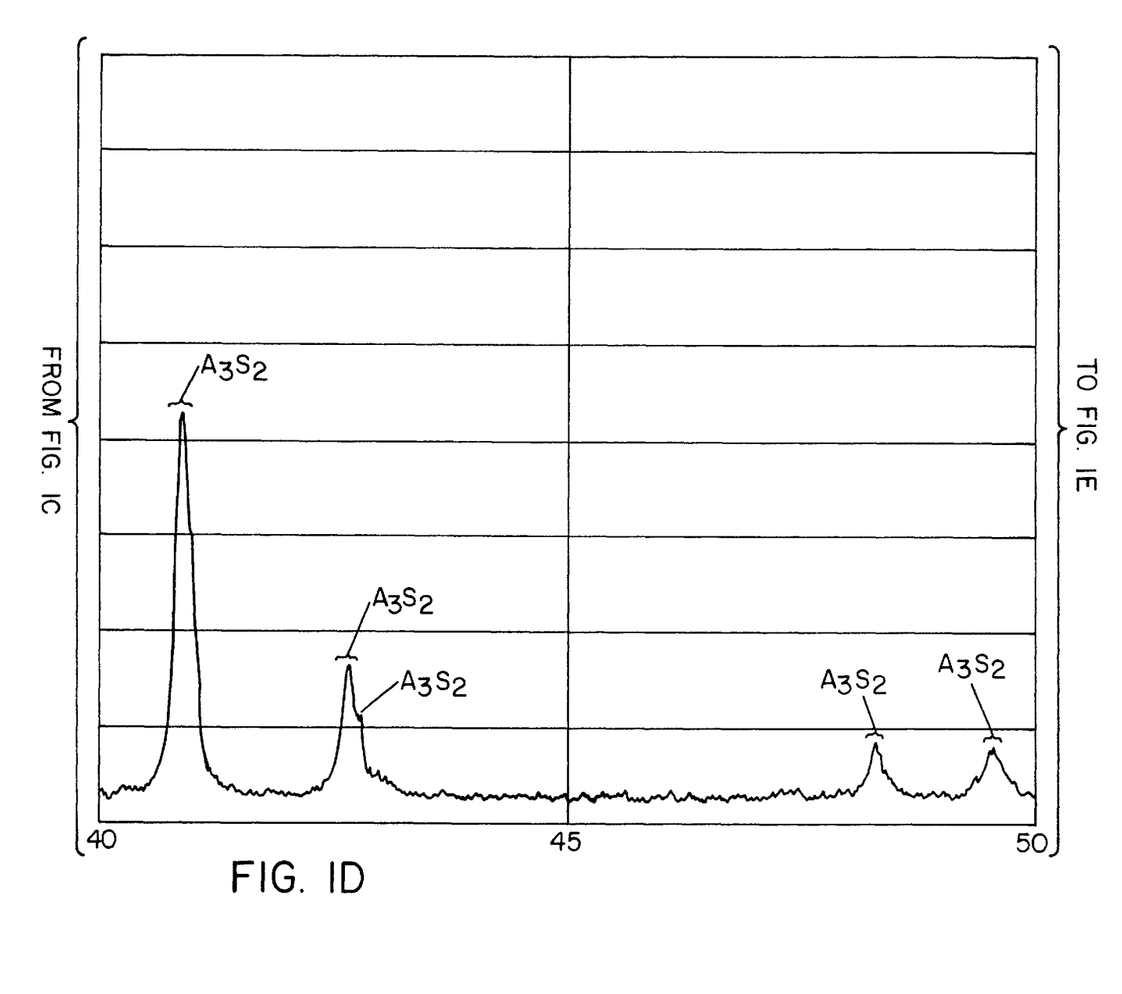
Figure 1E:
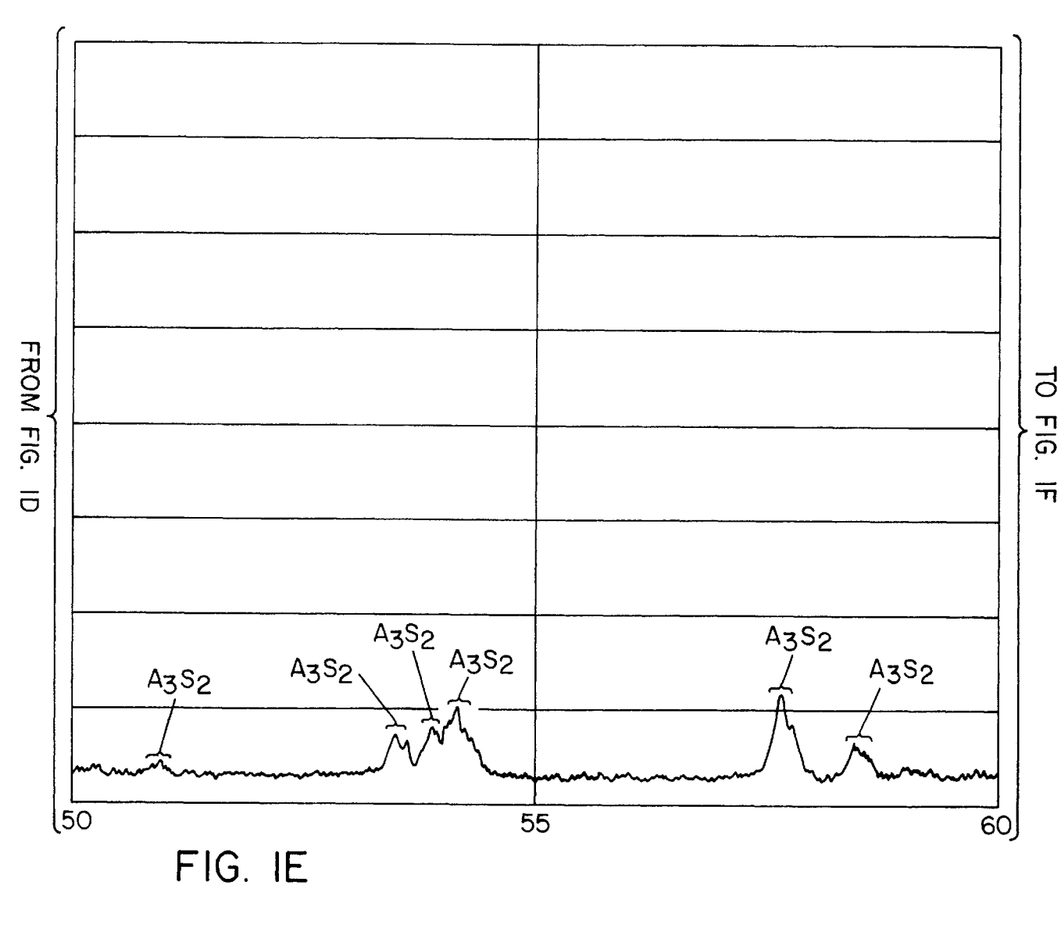
Figure 1F:
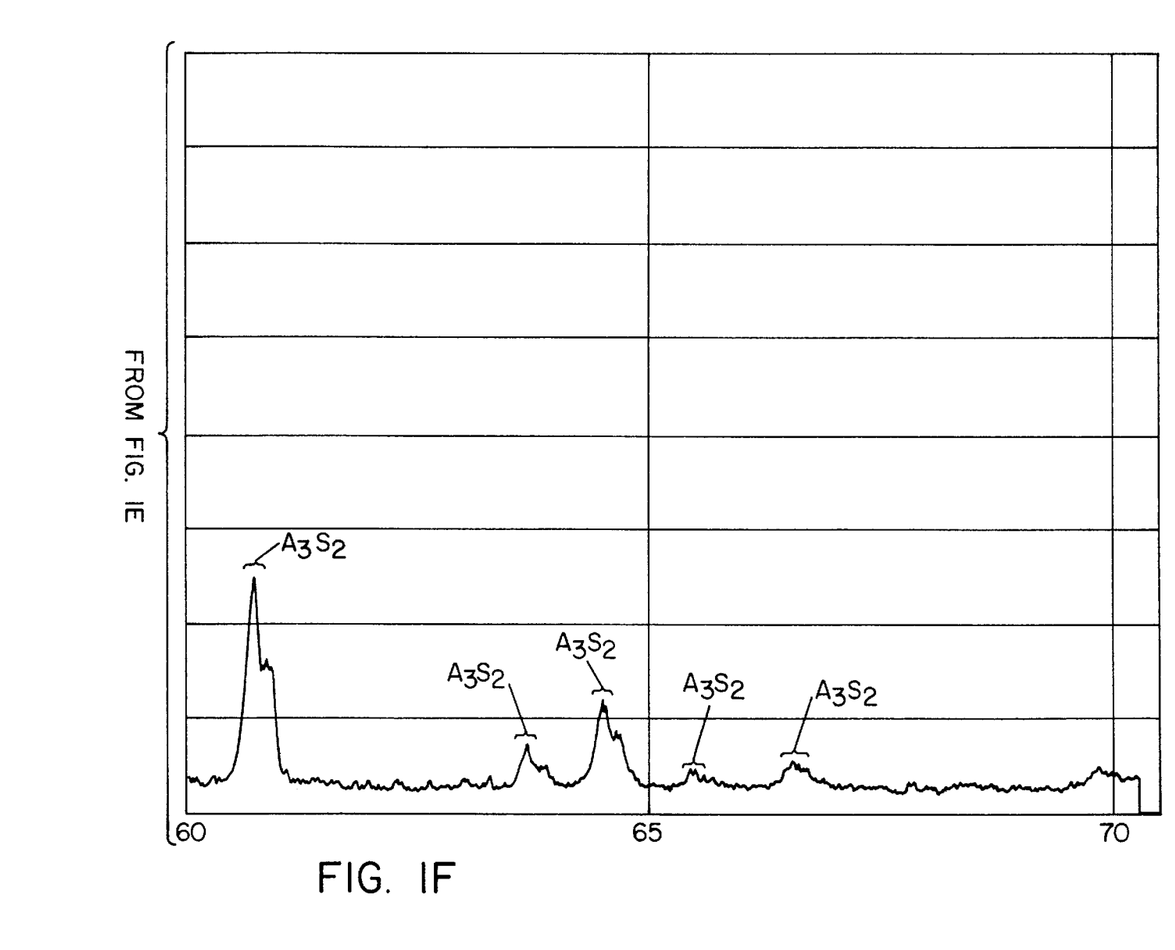
Figure 2:
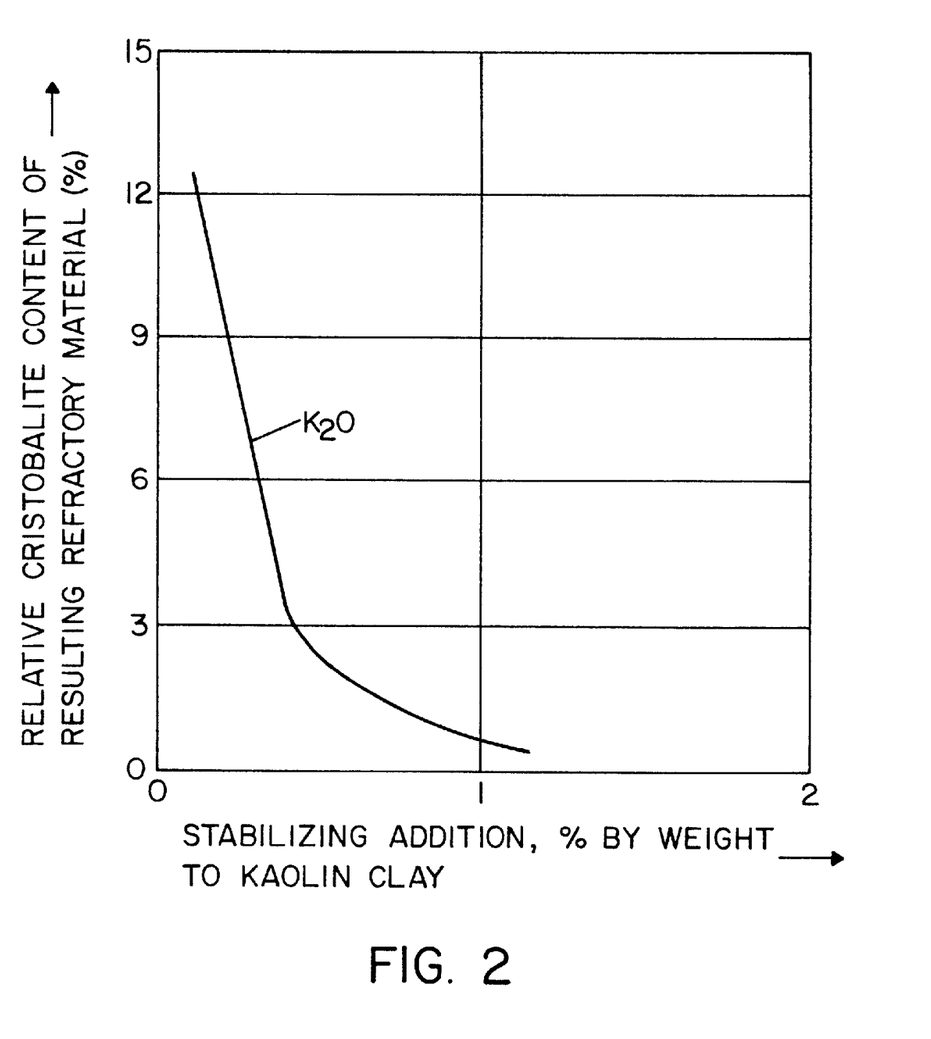
FIG. 2 is a graph showing the relationship between the addition of potassium oxide ($K_2O$) and the formation cristobalite in calcining kaolin clay.

During the soak, mullite crystals increase in size and are wetted by the liquid glassy phase. As the product is discharged from the kiln and rapidly cooled, an amorphous solid phase forms from the liquid wetting and surrounding the mullite crystals. The X-ray diffraction pattern shows an obsidian amorphous hump at 2θ=15° to 30°. Obsidian may be considered as a supercooled liquid made from a mixture of alkali, feldspar and silica. Its viscosity is enormous (i.e., millions of poises) as contrasted to commercial glass (10 to 50 poise). This makes the obsidian-like material an excellent bonding material. Softening temperatures of amorphous obsidian are high, providing favorable heat shock resistance. As indicated above, about 1% potassium oxide is preferably added to the pure kaolin clay to form cristobalite-free mullite. It has been found that as the amount of potassium oxide added to the kaolin drops below about 1%, increasing amounts of cristobalite are present in the final mullite product. In other words, as the percentage of the added potassium oxide decreases below about 1% by weight, increasing amounts of cristobalite are formed. On the other hand, too much potassium oxide affects the viscosity of the obsidian-like bonding material, thereby producing a less viscous bonding material. FIG. 2 generally shows the relationship between the added potassium oxide ($K_2O$) to the percentage of cristobalite in the resulting material. The present invention thus provides a process for controlling the cristobalite in mullite grain. By controlling the amount of the fluxing additive, a cristobalite-free mullite grain suitable for use in refractory products can be produced, which mullite does not possess the deleterious expansion and volume change characteristics of mullite containing cristobalite.

The present invention has been described with respect to a preferred embodiment. Modifications and alterations may occur to others upon the reading and understanding of the specification. For example, it is believed that materials other than potash feldspar may find advantageous application in retarding the formation of cristobalite and facilitating the formation of a supercooled liquid material. For example, it is believed that water insoluble colemanite ($Ca_2B_6O_{11}*5H_2O$) would also serve to produce a cristobalite-free, well-bonded mullite grain. In this situation, CaO and $B_2O_3$ serve to flux the silica from mullitization. In these cases, the glassy phase becomes E-glass.

Having described the invention, the following is claimed:

1. A method of calcining kaolin, comprising the steps of:
   a) producing a clay slurry comprised of water and kaolin clay;
   b) separating sand and impurities from said clay slurry to produce a beneficiated clay slurry, that is substantially free of sand and impurities, comprised of water and particles of kaolin clay;
   c) thoroughly mixing a water insoluble, potassium containing glass forming compound with said beneficiated clay slurry, said glass forming compound having particles sized to be about equal to or less than the particles of said kaolin clay within said beneficiated clay slurry and being added in an amount wherein said beneficiated clay slurry has a potassium content equal to about 1% by weight of said kaolin clay in said beneficiated clay slurry;
   d) removing sufficient water from said beneficiated clay slurry to give said beneficiated clay slurry an extrudable consistency;
   e) extruding said beneficiated clay slurry into elongated shapes;
   f) heating said elongated shapes by continuously moving said elongated shapes through a furnace having a zone, wherein said shapes are exposed to a temperature of at least 2700° F., and wherein said shapes are exposed to said zone for at least 30 minutes.

2. A method as described in claim 1, wherein said potassium containing glass forming compound is potash feldspar.

3. A method as described in claim 2, wherein said kaolin clay has a particle size of about 20 microns or less and said potash feldspar has a particle size of about 12 microns.

4. A method as described in claim 1, further comprising the steps of:
   f) cooling the heated shapes; and
   g) crushing the heated shapes.

5. A method of producing cristobalite-free, mullite grain, comprising the steps of:
   a) preparing a kaolin clay slurry, that is substantially free of sand and impurities, comprised of water and kaolin clay;
   b) thoroughly mixing a fluxing agent comprising a potassium containing glass compound with said kaolin clay slurry; said compound being selected from the group consisting of potash feldspar, colemanite and E-glass, and being added in an amount wherein said clay slurry has a potassium content equal to about 1% by weight of said kaolin clay in said clay slurry;
   c) heating the kaolin clay at a sufficient temperature for a sufficient period of time to:
      i) dehydrate said clay,
      ii) dehydroxylate said dehydrated clay to form metakaolin,
      iii) break down said metakaolin to form mullite and concomitantly forming a liquid phase material comprised of silica, alumina and potassium oxide, and
   d) cooling said mullite and said liquid phase material.

6. A method as described in claim 5, wherein said kaolin clay and said potassium containing glass compound have approximately the same particle size.

7. A method as described in claim 5, wherein said liquid phase material when cooled is comprised by weight of the following:
   about 81% $SiO_2$
   about 12.8% $Al_2O_3$
   about 3.4% $K_2O$.

8. A Method as described in claim 7, wherein said liquid phase material further includes the following by weight:
   about 2.8% $TiO_2$
   about 0.25% $Fe_2O_3$
   about 0.1% CaO.

9. A method as described in claim 5, further comprising the step of:
   e) crushing the mullite.

10. A method of producing a cristobalite-free bonded mullite grain from kaolin clay, comprising the steps of:
    a) forming an extrudable mixture comprised of a substantially sand and impurity-free kaolin clay, water and potash feldspar, said kaolin clay and said potash feldspar being present within said extrudable mixture in amounts wherein said mixture has a potassium content equal to about 1% by weight of said kaolin clay in said mixture;
    b) extruding the mixture to a size and shape suitable for calcining in a kiln to prevent dusting;
    c) calcining the mixture in a kiln under time and temperature conditions sufficient to cause said kaolin clay to form mullite and silica; and,
    d) further heating the mixture until said silica and said potash feldspar react to form additional mullite and a liquid phase material that wets the mullite.

11. A refractory material comprised of mullite crystals in a cristobalite-free matrix of a glassy phase material, said mullite crystals identifiable by X-ray diffraction peaks at 2 $\theta$=16.5°, 26.5°, 31°, 33.3°, 35.3° and 40.9°, and said glassy phase material being comprised of the following material by weight:
    about 3.4% $K_2O$
    about 12.8% $Al_2O_3$
    about 81% $SiO_2$
    about 2.8% $TiO_2$.

* * * * *

UNITED STATES PATENT AND TRADEMARK OFFICE
CERTIFICATE OF CORRECTION

PATENT NO : 5,948,713
DATED : September 7, 1999
INVENTOR(S) : William D. Smiley, Robert L. Antram, Randy Lemley, and Keith T. Snider It is certified that error appears in the above-identified patent and that said Letters Patent is hereby corrected as shown below:

Column 7, line 36, delete "1800OF" and insert therefor --1800°F--;

line 46, delete "27500F" and insert therefor --2750°F--;

line 49, delete "27500°F" and insert therefor --2750°F--.

Signed and Sealed this

Eighteenth Day of April, 2000

*Attest:*

Q. TODD DICKINSON

*Attesting Officer*  *Director of Patents and Trademarks*